E. A. WILSKE.
CHRISTMAS TREE STAND.
APPLICATION FILED FEB. 2, 1921.
1,394,386. Patented Oct. 18, 1921.
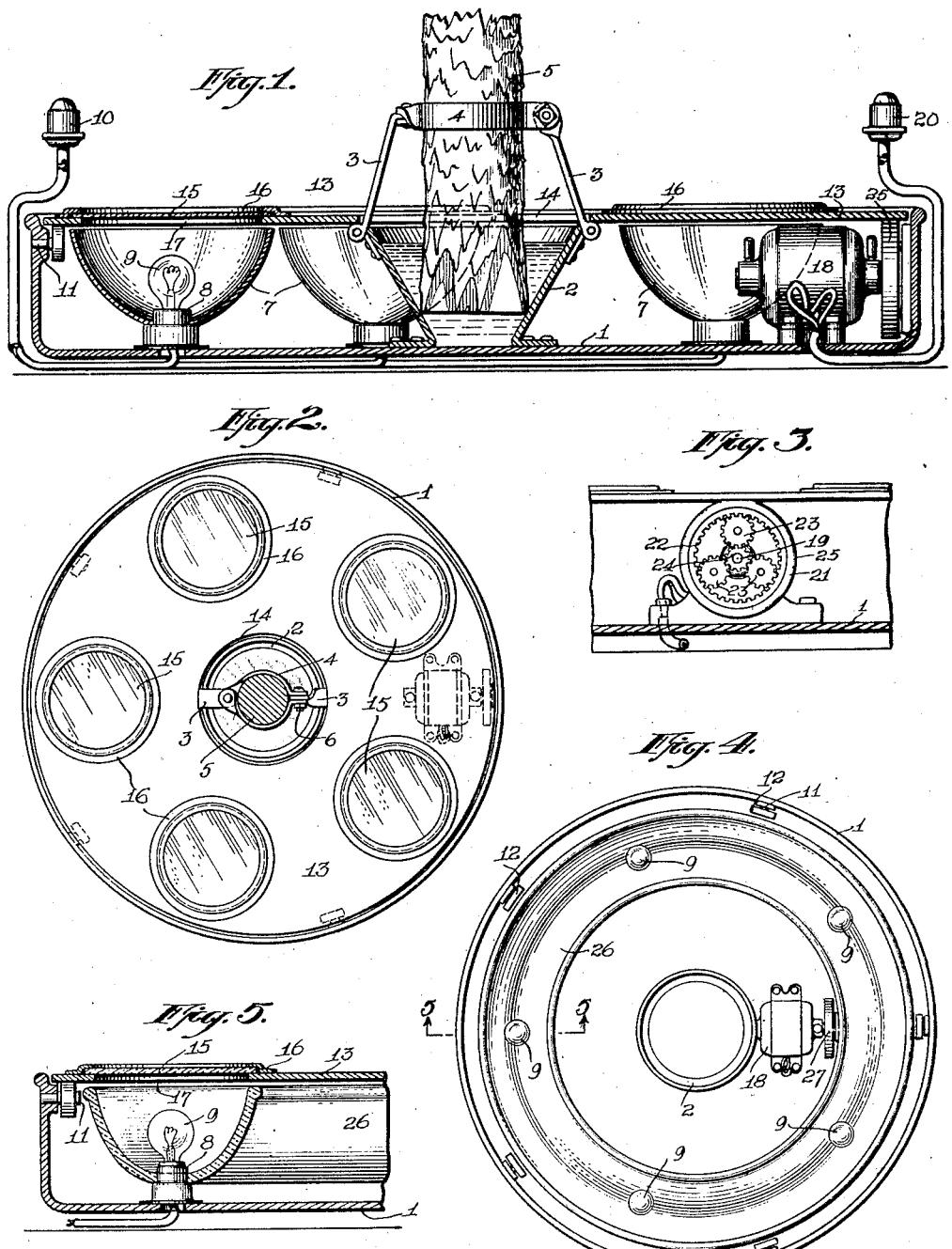
WITNESSES
H. Harwood
F. J. Foster
INVENTOR
Edward A. Wilske.
BY
ATTORNEYS

UNITED STATES PATENT OFFICE.

EDWARD ABBERT WILSKE, OF VINELAND, NEW JERSEY.

CHRISTMAS-TREE STAND.

1,394,386.  Specification of Letters Patent.  Patented Oct. 18, 1921.

Application filed February 2, 1921. Serial No. 441,888.

*To all whom it may concern:*

Be it known that I, EDWARD A. WILSKE, a citizen of the United States, and a resident of Vineland, in the county of Cumberland and State of New Jersey, have invented a new and Improved Christmas-Tree Stand, of which the following is a full, clear, and exact description.

This invention relates to improvements in Christmas tree stands, an object of the invention being to provide a stand of this character which will serve to rigidly support a tree in upright position and to provide illuminating means associated with the stand for throwing light upwardly on to the tree.

A further object is to provide a vari-colored translucent revolving element associated with the stand, which will serve to give a constantly changing illumination to the tree.

Another object is to provide improved means for revolving the vari-colored translucent element.

A still further object is to provide a device of the character stated which will be simple and practical in construction, strong and durable in use, and neat and attractive in appearance.

With these and other objects in view, the invention consists in certain novel features of construction and combinations and arrangements of parts, to be more fully hereinafter described and pointed out in the claims.

In the accompanying drawings:

Figure 1 is a view in longitudinal section through my improved stand;

Fig. 2 is a reduced top plan view thereof;

Fig. 3 is a fragmentary detail view illustrating the means for imparting motion to the wheel 21;

Fig. 4 is a top plan view of a modified form of the device with the cover removed; and Fig. 5 is a fragmentary view in section on the line 5—5 of Fig. 4, with the cover in place.

Referring particularly to Figs. 1, 2 and 3, of the drawings, 1 represents a shallow circular metal pan, which is provided with a centrally disposed cup shaped water receptacle 2. A pair of arms 3 are pivoted at diametrically opposed points to the upper edge of the cup 2. One of these arms carries a split collar 4, adapted to encircle the trunk of a Christmas tree 5, which has its lower end positioned in the water receptacle 2 as indicated in Fig. 1. The free ends of the collar 4 are bolted or otherwise secured as indicated at 6 to the free end of the other arm 3, so that the tree 5 is rigidly supported in upright position.

Cup shaped reflectors designated by the reference numeral 7 are arranged within the pan 1 in an annular series around the receptacle 2. Each reflector is provided with a lamp socket 8, which receives an electric light bulb 9. The bulbs 9 are connected to any suitable source of current as indicated at 10.

Inwardly projecting studs 11 around the upper edge of the pan 1, provide mounting for rollers 12. The rollers 12 serve to support the edges of a circular cover 13, which is provided with a centrally disposed opening 14 to accommodate the lower end of the tree 5.

Circular translucent portions such as 15, are provided in the cover and register with the reflectors 6. These translucent portions preferably comprise plates of glass of various colors, mounted in frames 16 over openings 17 in the cover, so that a pleasing optical effect will be produced when the cover is rotated.

Any approved means of rotating the cover may be employed. For the purpose of illustration, I have shown a small electric motor 18, located within the pan 1, and having the drive shaft 19 disposed radially of the pan. The motor is driven from any suitable source of power, as indicated at 20. A rubber tired wheel 21 engageable with the under face of the cover 13 is mounted adjacent one side of the pan and includes an internal annular gear 22 connected through the medium of certain reducing gears such as 23, to a pinion 24, carried by the drive shaft of the motor. The rubber tired periphery of the wheel 21, by virtue of its frictional engagement with the under face of the cover 13, will tend to rotate the cover around the tree, the rollers 12 facilitating such rotation.

In Figs. 4 and 5, I have illustrated a slight modification wherein I substitute an annular reflector 26, for the series of reflectors employed with the preferred form of the device. When this form of reflector is used, the wheel 27 for the sake of convenience is mounted to engage the intermediate portion of the cover rather than its outer edge.

Various slight changes and alterations might be made in the general form and arrangement of the parts described without departing from the invention and hence I do not limit myself to the precise details set forth, but shall consider myself at liberty to make such slight changes and alterations as fairly fall within the spirit and scope of the appended claims.

I claim:

1. A device of the character described comprising a pan shaped supporting base, a centrally disposed tree receiving receptacle in the base, an annular series of lights around the receptacle, a cover, rollers extending inwardly from the sides of the base and supporting the cover, said cover having an opening therein adapted to expose the receptacle, an annular series of translucent portions in the cover registering with the lights and means frictionally engageable with the cover for revolving the same.

2. A device of the character described comprising a pan shaped supporting base, a centrally disposed tree receiving receptacle in the base, an annular series of lights around the receptacle, a cover, rollers extending inwardly from the sides of the base and supporting the cover, said cover having an opening therein adapted to expose the receptacle, an annular series of translucent portions in the cover registering with the lights and means for revolving the cover, said means comprising a rubber tired wheel mounted adjacent one side edge of the base and frictionally engageable with the under face of the cover to revolve the same on the rollers.

3. A device of the character described comprising a pan shaped supporting base, a centrally disposed tree receiving receptacle in the base, an annular series of lights around the receptacle, a cover, rollers extending inwardly from the sides of the base and supporting the cover, said cover having an opening therein adapted to expose the receptacle, an annular series of translucent portions in the cover registering with the lights and means for revolving the cover, said means comprising a wheel mounted adjacent one side edge of the base and frictionally engageable with the under face of the cover to revolve the same on the rollers, a motor on the base and a speed reducing gear operatively connecting the motor and the wheel.

4. A device of the character described, including a shallow pan shaped base, a receptacle in said base, tree supporting means associated with the receptacle, an annular series of lights in the base, a vari-colored disk having a central opening adapted to expose said receptacle, supporting means for said disk having rolling engagement therewith when the disk is rotated, and means for rotating the disk.

EDWARD ABBERT WILSKE.